Oct. 13, 1964   W. A. MEIER   3,152,621
METHOD OF STRAP SEALING AND SHEARING
Filed Aug. 31, 1961   2 Sheets-Sheet 2
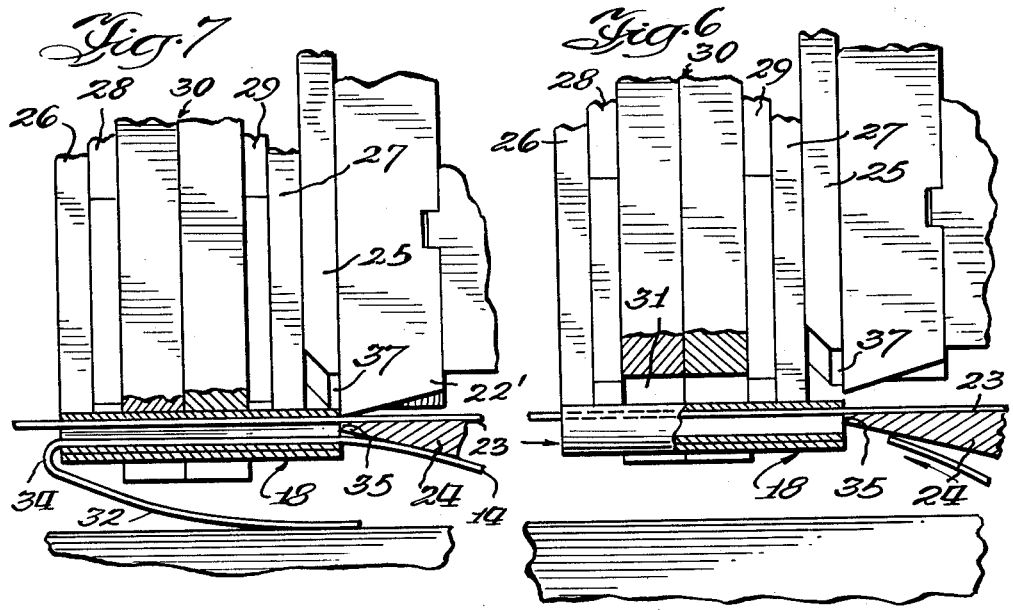
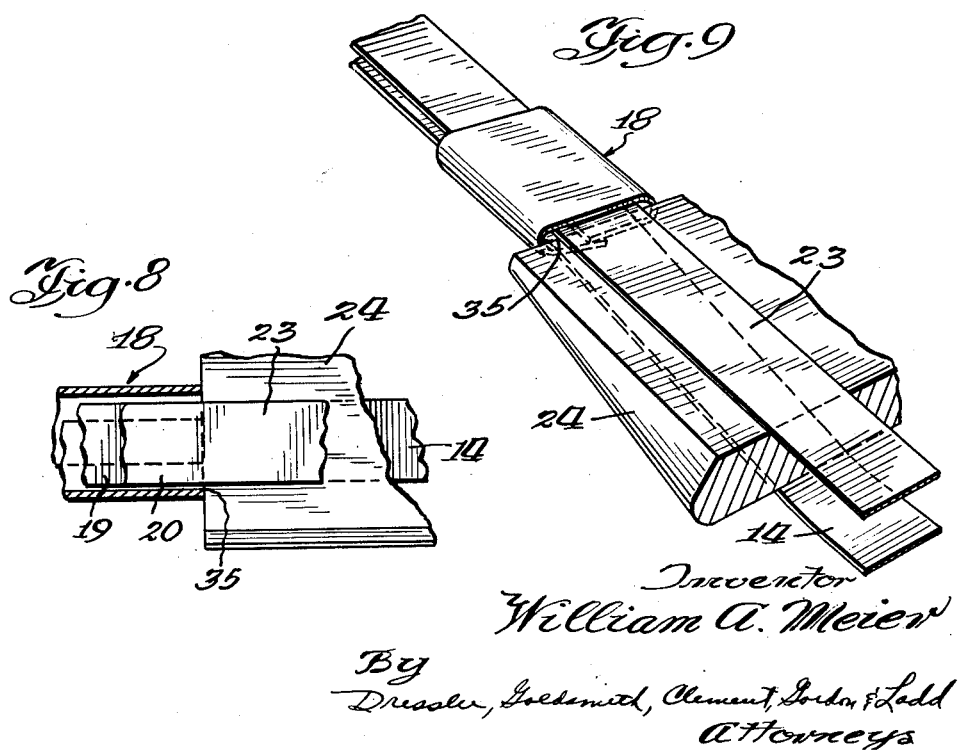

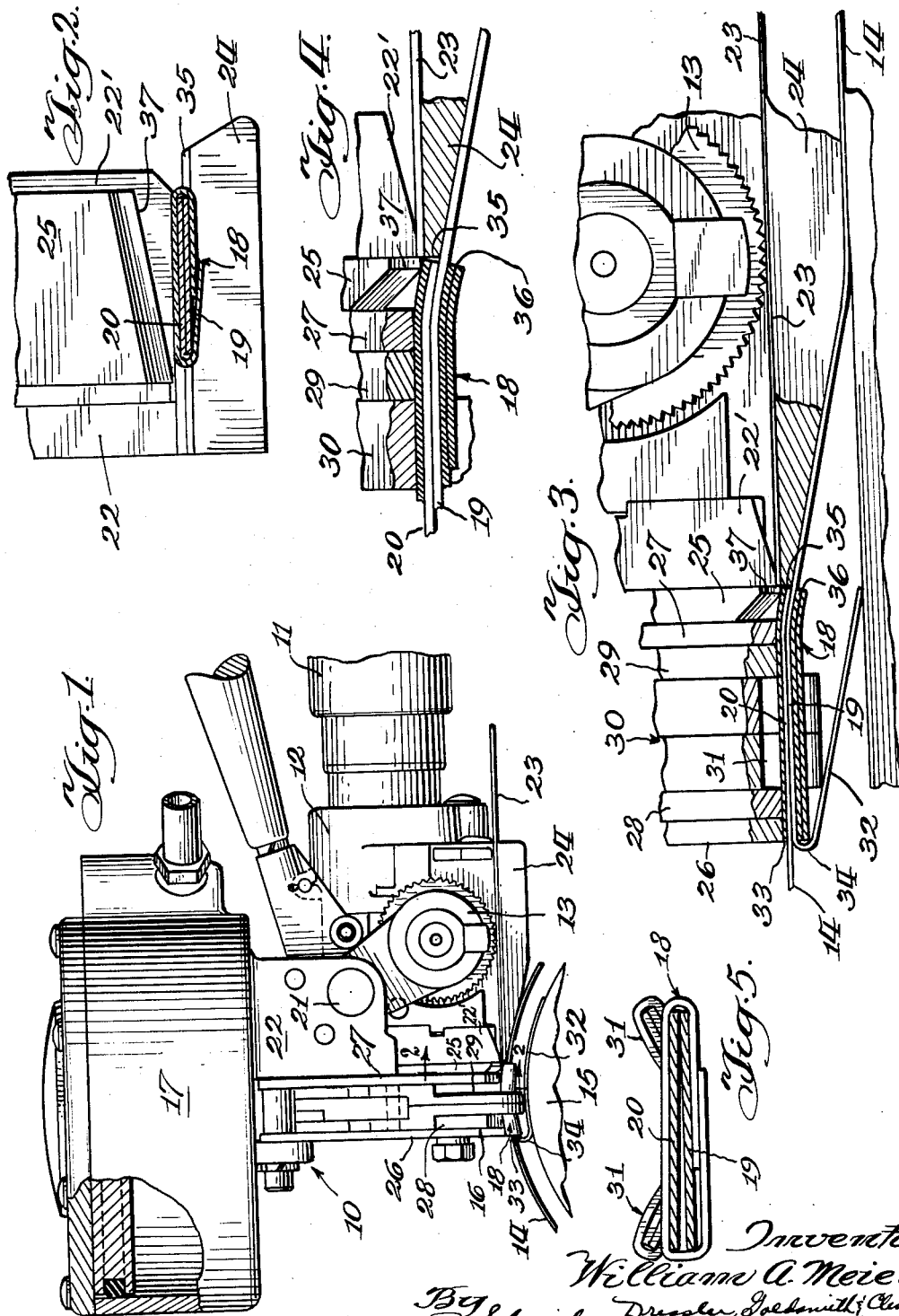

United States Patent Office 3,152,621
Patented Oct. 13, 1964

3,152,621
METHOD OF STRAP SEALING AND SHEARING
William A. Meier, Roselle, Ill., assignor to Signode Steel Strapping Company, a corporation of Delaware
Filed Aug. 31, 1961, Ser. No. 135,306
11 Claims. (Cl. 140—93.4)

The present invention relates to a new and improved method of strap sealing and shearing and particularly to a new and improved method wherein the seal is employed as a shearing element for severing the strap.

In more general terms, the invention pertains to the field of packaging with particular reference to the manner of packaging in which the package or bundle is held assembled by a ligature such as a steel strap. The strap is normally placed about the package, circumscribing the same, and tensioned to hold the package together. The overlapping portions of the strap are then circumscribed by a seal structure which is crimped with the overlapping portions therein and the excess strap externally of the seal is sheared close to the edge of the seal for removal thereof. The shearing or severing of the strap also facilitates use of a continuous length of strap as the same may be supplied from a coil thereof.

Heretofore, the shearing of the strap was effected by use of a pair of cutter blades which were disposed as close as mechanically convenient to the seal. In accordance with the present invention, however, the seal itself forms one of the cutting members, so that the strap is cut along an edge of the seal thereby eliminating the possibility of exposing sharp corners of strap and reducing strap waste to a nil quantity.

There is provided in accordance with this invention a new and improved method of securing overlapping portions of a ligature and severing the excess ligature material therefrom, as well as a new and improved method of severing excess ligature material from a secured joint of overlapped ligature portions.

In accordance with the method of this invention the overlapped portions of a ligature or a pair thereof are circumscribed by a seal, the outer face of the seal is backed along an edge thereof while the excess ligature material adjacent to that edge is also backed and relative movement is provided between the excess portion of the ligature and the edge of the seal so that the ligature is severed along the edge of the seal with the edge of the seal forming a severing element.

In the specific arrangement for effecting the method of the present invention shown in the drawings forming a part hereof and described in detail hereinbelow, a stop is provided on the inner or lower ligature portion of the overlapping portions with both overlapping portions threaded through a circumscribing seal. The upper or outer of the overlapping ligature portions is pulled while an edge of the seal is pushed against the stop. The pulling operation is generally continued until a desired tension in the strap is reached. The seal and the overlapping portions of strap therein are crimped to secure the same together and then as the final stages of the crimping operation are being effected, the excess strap pulled through the seal during the tensioning operation is severed along and by an edge of the seal.

The severing operation may be effected beginning at one lateral edge of the strap or at both lateral edges of the strap as desired. In either instance the manner of severing is controlled by appropriate configuration of a backing member which engages the outer surface of the seal adjacent to the edge thereof which effects the severing of the strap. If the backing member is straight and at an acute angle with respect to the seal, the severing will be effected beginning at one edge of the strap and continuing transversely of the strap to the opposite edge thereof. If the seal engaging edge of the backing member is of inverted V configuration, the severing operation will begin at both lateral edges of the strap and progress inwardly toward the center of the strap or the apex location of the inverted V edge of the backing member.

The foregoing and numerous other features and advantages of the present invention will become readily apparent from the following detailed description and from the accompanying drawings which are incorporated as a part hereof, so that each and every detail shown thereon is included as a part hereof, in which like reference numerals refer to like parts, and in which:

FIGURE 1 is an elevational illustration of an illustrative mechanism capable of carrying out the method of the present invention;

FIG. 2 is a fragmental, sectional view of the arrangement shown in FIG. 1, taken substantially along the line 2—2 of FIG. 1;

FIG. 3 is an enlarged fragmental illustration of the strap, seal, and strap and seal contacting portions of the arrangement of FIG. 1;

FIG. 4 is a still further enlarged fragmental illustration of the strap and seal and some of the strap and seal contacting elements;

FIG. 5 is a cross-sectional view of the stap and seal along the edge of the seal where the strap is severed;

FIGURE 6 is an enlarged fragmental illustration showing the seal in position and the tool located in place over the seal;

FIGURE 7 is a view similar to FIGURE 6, but shows the tool positioned just prior to severing the excess strap;

FIGURE 8 is a partial fragmentary view showing the postion of the foot of the tool relative to the edge of the seal; and FIGURE 9 is a perspective view showing the relative positions of the overlapping strap portions, seal and foot before the excess strap is severed.

A combination tensioning, sealing or crimping and shearing tool which is operative to assist in carrying out the method of the present invention is illustrated in FIG. 1. This tool 10, it will be appreciated, is merely illustrative of one of several types of tools that may be employed for performing or assisting in performing the method of the instant invention. Manual, semi-automatic, automatic portable and stational tools and machines may be constructed and employed for this purpose. The particular tool 10 illustrated in FIG. 1 has a motor 11 connected through a gear box 12 to a strap tensioning wheel 13 to drive the same and draw the strap 14 taut about a package 15. The machine also has a crimping jaw mechanism 16 operatively connected to a piston and cylinder assembly 17, or other driver, which is effective to drive the same to crimp a seal 18 and the overlapping strap portions 19 and 20 disposed therein. It will be appreciated that the power units 11 and 17 may be energized from any desired source and may be effective for pneumatic, hydraulic or electric operation.

The motor 11, gear box 12 and knurled tensioning wheel 13 are secured together and pivotally mounted for limited rotational movement about a pivot pin 21 on the main frame 22 of the tool. This permits disposition of the excess portion 23 of the strap between a foot 24 on the main frame and the tensioning wheel. The mechanism, insofar as its structure is pertinent to this discussion, also includes a reciprocable seal-backing and contacting member 25 arranged to be driven downwardly or inwardly of the package 15 by appropriate coupling with the crimping jaw assembly 16 and the piston and cylinder assembly 17.

The crimping jaw assembly 16 includes a pair of fixed mounting plates 26, and 27, a pair of notcher plates or blocks 28 and 29 secured to the inner surfaces of the mounting plates and a set of pivotally mounted crimping jaws 30. In this particular arrangement the crimping jaws and notcher plates are so arranged that when the driver therefor is energized, they will form a cut-type crimp or notch as illustrated elevationally in FIG. 5, so that a pair of upwardly extending ear-like notch portions 31 are provided at opposite lateral edges and the overlapping portion of the strap at opposite lateral edges thereof. It will be appreciated, of course, that any desired type of notching and crimping may be effected within the scope of the present invention.

Turning now to FIGURES 6 and 7, there are illustrated the various components of the combination tensioning, sealing and shearing tool when it is first disposed about the seal and the location of the components thereof immediately prior to severing the excess strap, respectively.

In FIGURE 6, the crimping jaws have not been actuated and thus the seal is shown in the uncrimped state. In FIGURE 7, the seal crimping action has been started and the positions taken by the various components of the tool are those that exist immediately prior to the severing action of the excess strap by the edge 36 of the seal. In this position, the bottom front edge of nose 22' on frame 22 is disposed against edge 36 of the seal, which is opposite to the edge 33 thereof.

As can be readily seen in FIGURE 9, the toe 35 of the foot 24 is positioned in contact with the edge 36 of the seal 18, and the foot 24 serves as a support for the excess strap portion 23. When the backing member 25 is moved downwardly, the portion of the seal adjacent edge 36 contacts the overlapping strap portion 20 and severs excess strap 23 therefrom. The crimping of the seal is then completed to lock the overlapping strap portions in place.

When the foregoing mechanism is employed to perform the method of this invention, the strap 14 is disposed about the package 15 circumscribing the same. The seal is first threaded onto the strap and when the package is completely circumscribed, the free end 32 of the strap is threaded through the seal beneath or inwardly of the strap portion already extending through the seal. The free end is then bent back or otherwise provided with stop means preventing such movement of the strap or seal as would permit unthreading or release of the free end of the strap from the seal.

With the strap in the position and condition described, the tool 10 is applied to the strap and disposed in the position shown in FIG. 1, so that the seal is below or inwardly of the crimping jaw assembly, one edge 33 of the seal is against the stop bend in the free end 32 of the strap and the excess portion 23 of the strap is disposed on the foot 24 and engaged by the tensioning wheel 13 on the upper surface of the strap. When the tool is in this position, the tapered blunt toe 35 (see FIGS. 3 and 4) of the foot and the bottom front edge of a nose 22' on the frame 22 are disposed against the edge 36 of the seal opposite to the edge 33 which engages the stop bend 34 in the free end of the strap.

Energization of the motor 11 drives the tensioning wheel to pull the upper or outer strap portion so that the strap is drawn to the desired tautness. When that stage is reached, the crimping driver 17 is energized to pivot the crimping jaws 30. As the crimping operation is being completed, the edge 37 of the seal-backing and contacting member 25 is brought to bear on the outer surface of the seal adjacent to the edge 36 thereof to provide relative movement between it and the foot 24. This relative movement is transmitted to the seal 18 at the edge 36 thereof and to the excess portion 23 of the strap adjacent to the edge 36 of the seal. Such relative movement of the seal and the external, outer strap portion or excess portion causes shearing of the strap or cutting thereof along and by the edge 36 of the seal. In the arrangement shown in the drawings, the relative movement is effected by pushing the seal edge downwardly and actually bending that portion of the seal as seen in FIGS. 3 and 4.

While it may be considered that the combination of the seal edge and the toe of the foot of the tool are operative as a pair of shearing jaws, or blades, the cutting action effected on the strap takes place on the edge of the seal.

In a preferred following of the method of this invention, the shearing of the strap is initiated at one lateral edge of the strap and progresses transversely of the strap to the opposite lateral edge thereof. This reduces the energy necessary to sever the strap. The severing action, when performed this way, may be characterized as a shearing or cutting or tearing action. However it is characterized or theorized, the strap is severed along and by the edge of the seal.

To effect the transverse severing action beginning at one edge of the strap, the seal-contacting edge 37 of the seal-backing member 25 is tapered and arranged at an acute angle with respect to the outer surface of the seal, as most readily seen in FIG. 2.

The edge 37, of course, could have other configurations, such as a negatively curved configuration or an inverted V configuration, which would change the pattern of the severing action of the strap along and by the edge of the seal to an action where severing would begin at both lateral edges of the strap and move progressively toward the center of the strap.

It will also be appreciated that numerous other modifications and variations may be effected within the true spirit and scope of the novel concepts and principles of this invention and without departing therefrom.

I claim:

1. A method of securing inner and outer overlapping portions of a ligature and of severing excess ligature material therefrom, comprising circumscribing a package to be secured with a ligature, circumscribing inner and outer overlapping portions of the ligature with a seal, bending back an end of the inner overlapping portion of the ligature to provide a stop for one end of the seal, pulling the outer overlapping portion of the ligature through the seal while pushing the seal against the bent back end of the ligature to tension the ligature about the package, supporting the outer overlapping portion of the ligature externally of the seal and adjacent to the outer surface of the seal and to an edge thereof, backing the outer surface of said seal at said edge, and relatively moving the seal and the outer overlapping portion of said ligature to sever the ligature along said edge of said seal while crimping the seal and the overlapping portions of the ligature to secure the same together.

2. A method of securing overlapping portions of a ligature and of severing excess ligature material therefrom, comprising circumscribing the overlapped portions of the ligature with a seal member, providing a stop on one of the ligature portions for abutment of an end of the seal member thereagainst pulling the other portion of the ligature through the seal while pushing the seal member against the stop on said one portion of said ligature to tension the ligature, supporting the pulled portion of the ligature externally of the seal member and adjacent to the outer surface of the seal member and adjacent to an edge thereof, backing the outer surface of said seal member at said edge, and relatively moving the seal and the other portion of said ligature to sever said other portion of said ligature along said edge of said seal while crimping the seal and the overlapping portions of the ligature to secure the same together.

3. A method of securing overlapping portions of a ligature and of severing excess ligature material therefrom, comprising circumscribing the overlapped portions of the ligature with a seal member, providing a stop on one of the ligature portions for abutment of an end of the seal member thereagainst pulling the other portion of the ligature through the seal while pushing the seal member against the stop on said one portion of said ligature to tension the ligature, supporting the pulled portion of the ligature externally of the seal member and adjacent to the outer surface of the seal member and adjacent to an edge thereof, backing the outer surface of said seal member at said edge, relatively moving the seal and the other portion of said ligature to sever said other portion of said ligature along said edge of said seal, and crimping the seal and the overlapping portions of the ligature to secure the same together, said crimping and said severing being effected substantially simultaneously but with said crimping being initiated prior to initiating the severing.

4. A method of securing overlapping portions of a ligature and of severing excess ligature material therefrom, comprising circumscribing the overlapped portions of the ligature with a seal member, providing a stop on one of the ligature portions for abutment of an end of the seal member thereagainst pulling the other portion of the ligature through the seal while pushing the seal member against the stop on said one portion of said ligature to tension the ligature, supporting the pulled portion of the ligature externally of the seal member and adjacent to the outer surface of the seal member and adjacent to an edge thereof, backing the outer surface of said seal member at said edge, and relatively moving the seal and the other portion of said ligature to sever said other portion of said ligature along said edge of said seal while crimping the seal and the overlapping portions of the ligature to secure the same together, said severing of said ligature along said edge of said seal member being initiated at one lateral edge of said ligature and progressing laterally of the ligature along said edge of said seal toward the opposite lateral edge of said ligature.

5. A method of securing overlapping portions of a ligature and of severing excess ligature material therefrom, comprising circumscribing the overlapped portions of the ligature with a seal member, providing a stop on one of the ligature portions for abutment of an end of the seal member thereagainst pulling the other portion of the ligature through the seal while pushing the seal member against the stop on said one portion of said ligature to tension the ligature, supporting the pulled portion of the ligature externally of the seal member and adjacent to the outer surface of the seal member and adjacent to an edge thereof, backing the outer surface of said seal member at said edge, and relatively moving the seal and the other portion of said ligature to sever said other portion of said ligature along said edge of said seal while crimping the seal and the overlapping portions of the ligature to secure the same together, said severing of said ligature along said edge of said seal member being initiated at opposite lateral edges of said ligature and progressing laterally of the ligature along said edge of said seal toward the center of the ligature.

6. A method of securing overlapping portions of a ligature and of severing excess ligature material therefrom, comprising disposing a seal about the overlapping portions of the ligature, crimping the seal and the overlapping portions of the ligature to secure the same together, and shearing excess material from the ligature by relatively moving said seal inwardly and said excess material outwardly with respect to said seal whereby the same is cut along an edge of said seal.

7. A method of securing overlapping portions of a ligature and of severing excess ligature material therefrom, comprising disposing a seal about the overlapping portions of the ligature, crimping the seal and the overlapping portions of the ligature to secure the same together, backing said seal adjacent to an edge thereof, backing excess ligature material adjacent to said edge of said seal, relatively moving the backing members toward each other and shearing the excess ligature material from the ligature by moving said edge of said seal inwardly with respect to said excess material whereby said excess material is cut along said edge of said seal.

8. A method of severing external excess strap from a length thereof having overlapping portions secured together by having a seal disposed thereabout and crimped thereto, comprising disposing a backing member under the excess strap adjacent to an edge of the seal, disposing a backing member on a surface of said seal and adjacent to said edge thereof, and relatively moving said backing members toward each other and said strap is severed along said edge.

9. A method of severing excess strap from a length thereof having overlapping portions to be secured together by having a seal disposed thereabout and crimped thereto, comprising disposing a backing member between the overlapping portions of the strap externally of the seal and adjacent to an edge of the seal, relatively moving said edge of said seal and said backing member toward each other and severing said strap along said edge.

10. A method of severing excess strap from a length thereof having overlapping portions to be secured together by having a seal disposed thereabout and crimped thereto, comprising disposing a backing member between the overlapping portions of the strap externally of the seal and adjacent to an edge of the seal, relatively moving said edge of said seal and said backing member toward each other and severing said strap along said edge, the severing of said strap being accomplished by initiating said relative movement of said backing member and said seal at one lateral edge of said strap and progressively effecting said relative movement toward the opposite edge of said strap to progressively cut said strap along and by said edge of said seal transversely of said strap from one edge thereof toward the other edge thereof.

11. A method of severing excess strap from a length thereof having overlapping portions to be secured together by having a seal disposed thereabout and crimped thereto, comprising disposing a backing member between the overlapping portions of the strap externally of the seal and adjacent to an edge of the seal, relatively moving said edge of said seal and said backing member toward each other and severing said strap along said edge, the severing of said strap being accomplished by initiating said relative movement of said backing member and said seal at opposite lateral edges of said strap and progressively effecting said relative movement toward the center of said strap to progressively cut said strap along and by said edge of said seal transversely of said strap from the edges thereof toward the center thereof.

References Cited in the file of this patent
UNITED STATES PATENTS

| | | |
|---|---|---|
| 1,836,147 | Wright | Dec. 15, 1931 |
| 2,097,946 | Childress | Nov. 2, 1937 |
| 2,281,438 | Heslet et al. | Apr. 28, 1942 |
| 2,882,934 | Gerrard | Apr. 21, 1959 |
| 3,021,876 | Hall et al. | Feb. 20, 1962 |